United States Patent
Wang et al.

(10) Patent No.: US 10,921,681 B2
(45) Date of Patent: Feb. 16, 2021

(54) OPTICAL COMMUNICATION SWITCH, OPTICAL CONTROLLING METHOD, ARRAY SUBSTRATE, AND DISPLAY DEVICE

(71) Applicant: BOE TECHNOLOGY GROUP CO., LTD., Beijing (CN)

(72) Inventors: Zhidong Wang, Beijing (CN); Lijia Zhou, Beijing (CN); Junrui Zhang, Beijing (CN); Ronghua Lan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 117 days.

(21) Appl. No.: 16/388,643

(22) Filed: Apr. 18, 2019

(65) Prior Publication Data

US 2020/0096832 A1  Mar. 26, 2020

(30) Foreign Application Priority Data

Sep. 26, 2018 (CN) .......................... 201811125244.7

(51) Int. Cl.
*G02F 1/01* (2006.01)
*G02F 1/19* (2019.01)
*G02F 1/00* (2006.01)

(52) U.S. Cl.
CPC .............. *G02F 1/195* (2013.01); *G02F 1/009* (2013.01); *G02F 1/0054* (2013.01); *G02F 1/0102* (2013.01); *G02F 1/0121* (2013.01)

(58) Field of Classification Search
CPC ........ G02F 1/195; G02F 1/0054; G02F 1/009; G02F 1/0102; G02F 1/0121
USPC .......................................................... 359/288
See application file for complete search history.

(56) References Cited

U.S. PATENT DOCUMENTS

2018/0113332 A1* 4/2018 Kwack .................. G02F 1/2257

* cited by examiner

*Primary Examiner* — William Choi
(74) *Attorney, Agent, or Firm* — McDermott Will & Emery LLP

(57) ABSTRACT

An optical communication switch, an optical controlling method, an array substrate and a display device are provided, the optical communication switch including: a first substrate and a second substrate opposite thereto; a first optical medium layer formed therebetween by a phase-change material, which has a first refractive index in a first state in which light rays implement one of an optical path state and an optical drop state, and a second refractive index in a second state in which light rays implement the other one of the optical path state and the optical drop state; a second optical medium layer also formed therebetween and in contact with the first optical medium layer by abutting against it closely, the second optical medium layer having a refractive index matching the first or second refractive index; and a heating device enabling the phase-change material to switch between the first and second states.

18 Claims, 4 Drawing Sheets

OPTICAL COMMUNICATION SWITCH, OPTICAL CONTROLLING METHOD, ARRAY SUBSTRATE, AND DISPLAY DEVICE

The present disclosure claims the benefit of Chinese Patent Application Invention No. 201811125244.7 filed on Sep. 26, 2018 in the State Intellectual Property Office of China, the whole disclosure of which is incorporated herein by reference.

BACKGROUND OF THE DISCLOSURE

Field of the Disclosure

Embodiments of the present disclosure generally relate to but are not limited to the technical field of optical devices, and in particular, to an optical communication switch, an optical controlling method, an array substrate, and a display device.

Description of the Related Art

With a rapid development of science and technology, information transmission capacity required in the communication field is increasingly augmented, and requirements on a transmission bandwidth of an optical communication network also become increasingly high. Therefore, it becomes a research focus how to transmit information more efficiently and swiftly through an optical communication network. In an optical communication network in the relevant art, in order to enhance transmission bandwidth, optical signals of various wavelengths may typically be transmitted through a single optical fiber, every optical signal having each single wavelength is a representative of a channel; in other words, a plurality of channels may coexist in a single optical fiber simultaneously for transmission of a plurality of datum. When it is desired to utilize a certain portion of the datum transmitted through the optical fiber, e.g., channels having wavelengths containing the certain portion of the datum may be eliminated from the optical signals entering an optical add-drop multiplexer (abbreviated as OADM) or an optical switch, so as to implement an optical drop state in which drop channels are directly turned to or switched to a processing apparatus for business processing, while other irrelevant channels may still be directly transmitted through the OADM (i.e., an optical path state is implemented for these irrelevant channels). Therefore, an optical switch may function as a key device for constructing an optical cross-connect (abbreviated as OXC), i.e., implementing an optical path state and an OADM, i.e., implementing an optical drop state), and thus is a vital element in an optical network and in turn is widely applied in the optical communication, optical computing, optical interconnection, and optical signal processing systems to function as a research hotspot of optical devices.

However, optical communication switches and optical controlling methods in the relevant art still need to be further improved.

SUMMARY OF THE DISCLOSURE

The embodiments of the present disclosure have been made to overcome or alleviate at least one aspect of the above mentioned disadvantages and/or shortcomings in the prior art, by providing an optical communication switch, an optical controlling method, an array substrate, and a display device.

Following technical solutions are adopted in exemplary embodiments of the invention. According to one aspect of embodiments of the disclosure, there is provided an optical communication switch, comprising: a first substrate and a second substrate opposite to each other; a first optical medium layer disposed between the first substrate and the second substrate and formed by a phase-change material, the phase-change material having a first refractive index in a first state thereof in which light rays passing therethrough implement one of an optical path state and an optical drop state, and a second refractive index in a second state thereof in which light rays passing therethrough implement the other one of the optical path state and the optical drop state; a second optical medium layer disposed between the first substrate and the second substrate and in contact with the first optical medium layer by abutting against the first optical medium layer closely, the second optical medium layer having a refractive index matching the first refractive index or the second refractive index of the first optical medium layer; and a heating device configured to enable the phase-change material to switch between the first state and the second state.

According to an exemplary embodiment of the present disclosure, a relative deviation between the refractive index of the second optical medium layer and the first refractive index or the second refractive index is not more than 25%.

According to an exemplary embodiment of the present disclosure, the relative deviation between the refractive index of the second optical medium layer and a larger one of the first refractive index and the second refractive index is not more than 25%.

According to an exemplary embodiment of the present disclosure, a contact surface which is an inclined surface exists between the first optical medium layer and the second optical medium layer, with an angle $\alpha$ larger than 0° and less than or equal to 90° being formed between the contact surface and the first substrate According to an exemplary embodiment of the present disclosure, the first optical medium layer and the second optical medium layer are two wedges in positive fit with each other, and an inclined surface of each wedge functions as the contact surface.

According to an exemplary embodiment of the present disclosure, the first substrate and the second substrate are provided parallel to each other, and the first optical medium layer and the second optical medium layer are two wedges which are congruent with each other, each wedge having a bottom surface in a form of square shape parallel to the first substrate, and a square sidewall which is located on an external side of the optical communication switch and perpendicular to the bottom surface; and wherein light rays are incident onto and enter the optical communication switch in a direction perpendicular to the square sidewall, with an angle between the contact surface and the first substrate being complementary to a critical angle of incidence for total reflection of the light rays at the contact surface.

According to an exemplary embodiment of the present disclosure, the phase-change material comprises $Ge_2Sb_2Te_5$, with the first state thereof being amorphous state and the second state thereof being crystalline state; and a material for forming the second optical medium layer comprises titanium dioxide.

According to an exemplary embodiment of the present disclosure, the first substrate and the second substrate are provided parallel to each other, and the first optical medium layer and the second optical medium layer are two wedges congruent with and in positive fit with each other, each wedge having a bottom surface in a form of square shape parallel to the first substrate, two regular-triangle sidewalls opposite to each other and perpendicular to the bottom surface, and a first quadrilateral sidewall and a second quadrilateral sidewall opposite to each other, the first quadrilateral sidewall being in a form of square shape perpendicular to the bottom surface and located on an external side of the optical communication switch, and the second quadrilateral sidewall functioning as the contact surface which is an inclined surface between the first optical medium layer and the second optical medium layer, with an angle α of 30° formed between the contact surface and the first substrate.

According to an exemplary embodiment of the present disclosure, the heating device is a heating electrode, the first optical medium layer is provided to abut against the first substrate, and the heating electrode is provided on a side of the first optical medium layer facing towards the first substrate.

According to an exemplary embodiment of the present disclosure, a material for forming the heating device comprises indium tin oxide.

According to an exemplary embodiment of the present disclosure, the first optical medium layer and the second optical medium layer are two prismatoids in positive fit with each other, and an inclined surface of each prismatoid functions as the contact surface.

According to an exemplary embodiment of the present disclosure, the first substrate and the second substrate are provided parallel to each other, and the first optical medium layer and the second optical medium layer are two prismatoids which are congruent with each other, each prismatoid having two bottom surfaces opposite to each other and each in a form of quadrilateral shape parallel to the first substrate, and four sidewalls each in a form of quadrilateral shape, one of two opposite sidewalls being located on an external side of the optical communication switch and the other one of the two opposite sidewalls functioning as the contact surface; and light rays are incident onto and enter the optical communication switch in a direction perpendicular to the one of two opposite sidewalls located on the external side, with an angle between the other one sidewall functioning as the contact surface and the first substrate being complementary to a critical angle of incidence for total reflection of the light rays at the contact surface.

According to an exemplary embodiment of the present disclosure, the first substrate and the second substrate are provided parallel to each other, and the first optical medium layer and the second optical medium layer are two prismatoids congruent with and in positive fit with each other, each prismatoid having two bottom surfaces opposite to each other and each in a form of square shape parallel to the first substrate, two trapezoidal sidewalls opposite to each other and perpendicular to the two bottom surfaces, and a first quadrilateral sidewall and a second quadrilateral sidewall opposite to each other, the first quadrilateral sidewall being a square which is perpendicular to the bottom surface and located on an external side of the optical communication switch, and the second quadrilateral sidewall functioning as the contact surface which is an inclined surface existing between the first optical medium layer and the second optical medium layer, with an angle α of 30° formed between the contact surface and the first substrate.

According to another aspect of embodiments of the disclosure, there is provided an optical controlling method with the optical communication switch according to claim 1, the method comprising: driving the phase-change material which forms the first optical medium layer to switch between the first state and the second state, by the heating device, so as to change an emergent direction of the light rays passing therethrough.

According to an exemplary embodiment of the present disclosure, the heating device is a heating electrode; and the step 'driving the phase-change material which forms the first optical medium layer to switch between the first state and the second state, by the heating device' further comprises: changing a condition of the first optical medium layer by controlling a voltage applied onto the heating electrode.

According to an exemplary embodiment of the present disclosure, the first optical medium layer is formed by $Ge_2Sb_2Te_5$, the second optical medium layer is formed by titanium dioxide, and the heating electrode is formed by indium tin oxide; and the phase-change material which forms the first optical medium layer is switched from a amorphous state to a crystalline state by applying a pulsed current having an magnitude of 0.2~0.8 mA on the first optical medium layer by the heating electrode for 6~100 ns.

According to another aspect of embodiments of the disclosure, there is provided an array substrate, comprising the optical communication switch as above.

According to another aspect of embodiments of the disclosure, there is provided a display device, comprising the array substrate as above.

BRIEF DESCRIPTION OF THE DRAWINGS

The above and/or additional aspects and advantages of the present disclosure will become apparent and easily understood from the following description of embodiments in conjunction with the accompanying drawings, in which.

DETAILED DESCRIPTION OF PREFERRED EMBODIMENTS OF THE INVENTION

Figure 1:
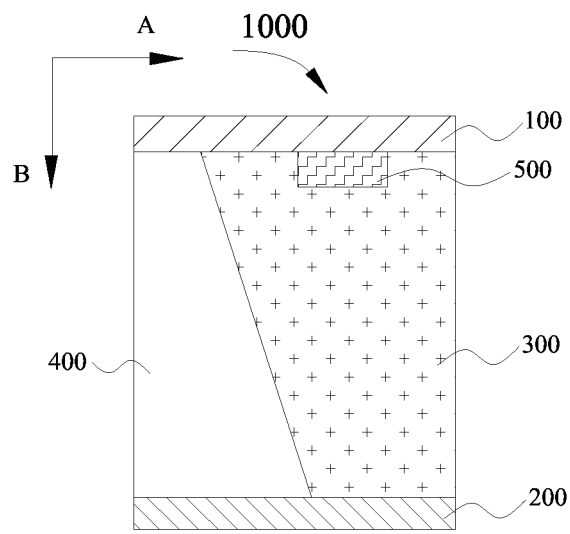
FIG. 1 illustrates a structural schematic view of an optical communication switch according to an embodiment of the disclosure.

Embodiments of the present disclosure are described in detail below, and examples of the embodiments are illustrated in the drawings, wherein the same or similar reference numerals are used to refer to the same or similar elements or elements having the same or similar functions. The embodiments described below with reference to the accompanying drawings are intended to be illustrative for the present disclosure, and are not to be construed as limiting the present disclosure.

Respective dimension and shape of each component in the drawings are only intended to exemplarily illustrate the contents of the disclosure, rather than to demonstrate the practical dimension or proportion of components of an optical communication switch, an array substrate, and a display device according to an embodiment of the disclosure.

Figure 2:
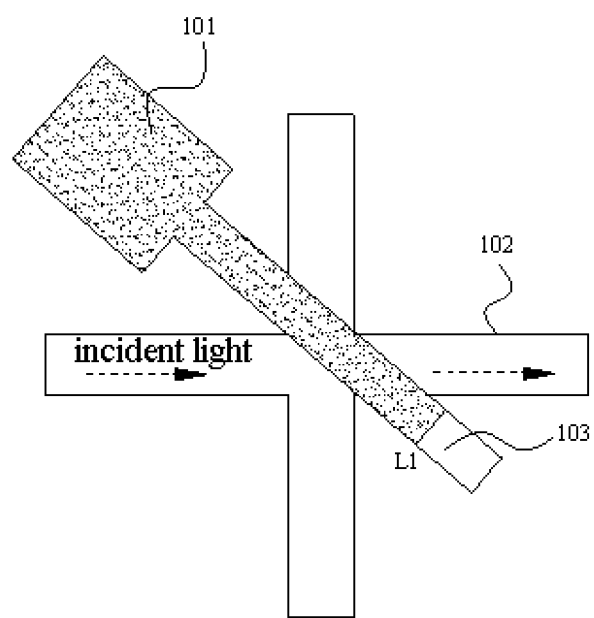
FIG. 2 illustrates a structural schematic view of a condition of an optical communication switch in a relevant art.
Figure 3:
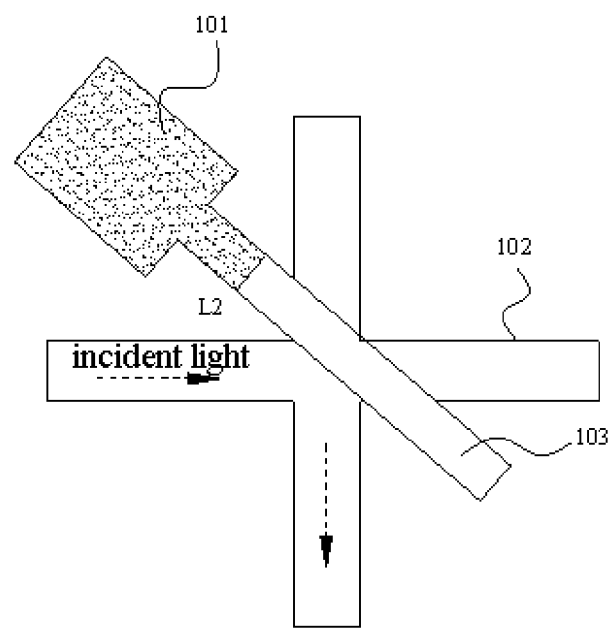
FIG. 3 illustrates a schematic top view of another condition of an optical communication switch in a relevant art.

In an optical communication network in the relevant art, it is desired to implement both optical path functionality and optical drop functionality at network nodes thereof; therefore, an optical switch is required. An operation principle of an optical switch commonly used in the relevant art is to change a position of liquid in a waveguide by driving liquid with a micro-fluidic switch so as to implement a transmission and a total reflection of light rays, facilitating optical path functionality and optical drop functionality of the light rays. By way of example, with reference to FIG. 2, when it is desired to implement the optical path functionality, with an action of an external force, liquid inside a small-scale liquid-filled reservoir/container (e.g., a small groove/tank) 101 is pulled/urged into a micro channel 103 which is in a form of a tubule or capillary tube in communication with the small-scale liquid-filled reservoir/container, and in turn flows to a junction between the micro channel 103 and a waveguide 102 (with reference to the illustration of FIG. 2, a liquid level is located at a location L1 as labeled therein), since the liquid has a refractive index approximate to a refractive index of the waveguide 102 and the tubule or capillary tube is filled with the liquid, then, a light path of light rays may for example be routed to continue to extend through the tubule or capillary tube of the micro channel 103 filled with the liquid, such that light rays may pass through the tubule or capillary tube filled with the liquid (in a propagating direction in which incident light rays follow as illustrated by an arrow in FIG. 2) without changing original light path, and the optical path functionality may be implemented by light rays propagating in a direction along which the original light path extends through the liquid filled at the junction between the micro channel 103 and a waveguide 102. And with reference to FIG. 3, when it is desired to implement the optical drop functionality, with the action of an external force once again, the liquid inside the micro channel 103 is pulled/urged back such that the junction between the micro channel 103 and the waveguide 102 is filled up with air (with reference to the illustration of FIG. 3, the liquid level is located at another location L2 as labeled therein), and then a total reflection of the light rays occurs at an interface between the liquid and the air to change the light path thereof, so as to implement the optical drop functionality at the junction between the micro channel 103 and a waveguide 102 (in a propagating direction in which incident light rays follow as illustrated by an arrow in FIG. 3). With the action of the external force, the fluid may fill up the junction between the micro channel 103 and a waveguide 102, or may be retracted from the junction, then a switching between the optical path state and the optical drop state may be implemented at the junction, i.e., facilitating an optical switching functionality by a micro-fluidic switch. As can be seen from above, an optical switch commonly used in the relevant art relates to liquid, and thus its manufacturing processes are relatively complicated; an external force is required to be applied to drive the liquid, with a relatively complex control on driving and a relatively low sensitivity; moreover, the micro-fluidic optical switch has a relatively long response time (i.e., a relatively slow response) typically with millisecond (ms) precision, which may fail to meet requirements on the optical communication network in the relevant art.

Embodiments of the disclosure are made on the basis of findings and knowledge concerning following facts and questions:

It has been found that, the optical switch in an optical communication network in the relevant art has problems such as relatively complicated preparing processes, a relative complex control on driving and a relatively long response time (i.e., a relatively slow response) and the like. Therefore, a new optical communication switch is required, which may simplify preparing processes, with a more convenient and sensitive driving and a shorter response time (a faster response).

In view of this, according to a general technical concept of the embodiments of the disclosure, in an aspect of embodiments of the disclosure, by way of example, an optical communication switch is proposed. According to embodiments of the disclosure, as illustrated in FIG. 1, the optical communication switch 1000 comprises: a first substrate 100 and a second substrate 200 opposite to each other; a first optical medium layer 300 disposed between the first substrate 100 and the second substrate 200; a second optical medium layer 400 disposed between the first substrate 100 and the second substrate 200 and in contact with the first optical medium layer 300 by abutting against the first optical medium layer 300 closely; and a heating device 500 which is for example interposed between and surrounded/encapsulated by the first optical medium layer 300 and the first substrate 100, as illustrated in FIG. 1. The first optical medium layer 300 is formed by a phase-change material, the phase-change material having a first refractive index in a first state thereof (e.g., an amorphous state) in which light rays passing therethrough implement one of an optical path state and an optical drop state, and a second refractive index in a second state thereof (e.g., a crystalline state) in which light rays passing therethrough implement the other one of the optical path state and the optical drop state. The heating device 500 may heat the phase-change material to enable a state switch of the phase-change material between the first state and the second state (for example between the amorphous state and the crystalline state). The second optical medium layer 400 and the first optical medium layer 300 are in contact with each other by abutting against each other closely, the second optical medium layer 400 having a refractive index matching the first refractive index or the second refractive index of the first optical medium layer 300, i.e., their respective values being the same as or approximate to each other so as to minimize a reflection loss at an interface between the first optical medium layer and the second optical medium layer. As such, the optical communication switch 1000 contains no liquid therein, simplifying preparing processes; and for example the heating device 500 is utilized so as to facilitate a simple and convenient control on driving, with a relatively higher sensitivity; and the optical communication switch has a relatively shorter response time (i.e., a relatively faster response) e.g., having a response with a precision up to nanosecond (ns). Therefore, the optical communication switch 1000 has a superior usability.

For facilitating comprehension, it is set forth in detail an operation principle of the optical communication switch according to embodiments of the disclosure for obtaining beneficial effects as above.

As stated above, in an optical communication switch commonly used in the relevant art, the liquid is typically driven by a micro-fluidic switch so as to change a position of the liquid and in turn to implement a transmission and a total reflection of light rays, facilitating optical path functionality and optical drop functionality of the light rays. However, since the micro-fluidic optical switch relates to the fluid and thus is relatively complicated in terms of preparing processes thereof; an external force is required to be applied to drive the liquid, with a relatively complex control on driving and a relatively low sensitivity; moreover, the micro-fluidic optical switch has a relatively long response time (i.e., a relatively slow response) typically with millisecond (ms) precision, which may fail to meet requirements on the optical communication network in the relevant art.

In the optical communication switch according to embodiments of the disclosure, a layer formed by the phase-change material is initially formed into the first optical medium layer, and the phase-change material is for example driven by a heating applied by the heating device to switch between the first state and the second state (e.g., the amorphous state and the crystalline state); and accordingly, the refractive index of the layer of the phase-change material is also changed (for example, the first optical medium layer has the first refractive index in the first state and has the second refractive index in the second state); and the optical communication switch according to the embodiments of the disclosure further comprises the second optical medium layer formed by a material having its refractive index matching the first refractive index or the second refractive index of the first optical medium layer, the first optical medium layer and the second optical medium layer cooperating with each other to form the optical communication switch collectively. As such, once light rays are incident on and enter the optical communication switch, in a condition that respective refractive indices of the first optical medium layer and the second medium layer match each other (e.g., the refractive index of the second optical medium layer matches the first refractive index), the light rays may therefore pass through the optical communication switch directly so as to implement the optical path state; in other words, signals carried by the light rays may pass through the optical communication switch and in turn continue to propagate. Thereafter, once the first optical medium layer changes its state (for example, the first optical medium layer is switched from the first state to the second state due to the external force such as heating and the like which is applied onto the first optical medium layer, then the refractive index of the first optical medium layer is changed from the first refractive index into the second refractive index), the refractive indices of the first optical medium layer and the second optical medium layer no longer match each other, a total reflection of the light rays may for example occur at a contact surface between the first optical medium layer and the second optical medium layer and in turn may fail to pass through the optical communication switch directly, such that an optical drop state may be implemented (it should be noticed that, in a condition that the refractive indices of the first optical medium layer and the second optical medium layer fail to match each other, e.g., by adjusting an incidence direction and an incidence angle and the like of the light rays, then a total reflection of the light rays which are incident may occur at the contact surface so as to implement the optical drop state). Thereby, the optical communication switch simply use the phase-change material in a solid state to implement a switch between the two states of the optical path state and the optical drop state under an action of the external force. As compared with a switch between the optical path state and the optical drop state by means of the liquid as in the relevant art, the whole optical communication switch according to the embodiments of the disclosure may not relate to any liquid, and thus is relatively simpler in terms of preparing processes thereof; and the first optical medium layer may be simply heated by the heating device so as to implement a control on driving of the optical communication switch and in turn to facilitate a simple control of the optical path functionality and the optical drop functionality, with a simple operation and a relatively higher sensitivity. Furthermore, an intrinsic property or inherent attribute of the phase-change material lies in a quick phase transition, resulting in that the optical communication switch may response relatively faster (i.e., have a relatively shorter response time) for the external action which induces its state change, e.g., with a response time up to nanosecond (ns) precision, which further enhances a utility of the optical communication switch. It should be noticed that, in embodiments of the disclosure, a term "optical drop" has a meaning of "implementing an optical drop of optical signals which are contained within the light rays into a processing apparatus". In other words, the expression "optical drop" in embodiments of the disclosure means that the optical signals are transferred to downstream processing apparatus, i.e., the propagating path/direction in which the optical signals is transferred/displaced, rather than specifically referring to a change of the optical signals in "upper or lower" orientation in a specific space. Since the optical communication switch which is in the optical drop state according to embodiments of the disclosure may incur a total reflection of the light rays which are incident thereon, at the contact surface between the first optical medium layer and the second optical medium layer, resulting in that the optical signals contained in the light rays may change the propagating direction and be dropped into the processing apparatus located downstream so as to implement the optical drop. Specifically, once the optical communication switch is applied to the optical communication network, then under a cooperative effects of various controlling devices, certain desired optical signals may be transferred to be dropped to the processing apparatus from the light rays which are incident and contain a plurality of optical signals, so as to implement the 'OADM' of the light rays; at that time, the optical communication switch may for example function as the optical add-drop multiplexer.

Figure 4:
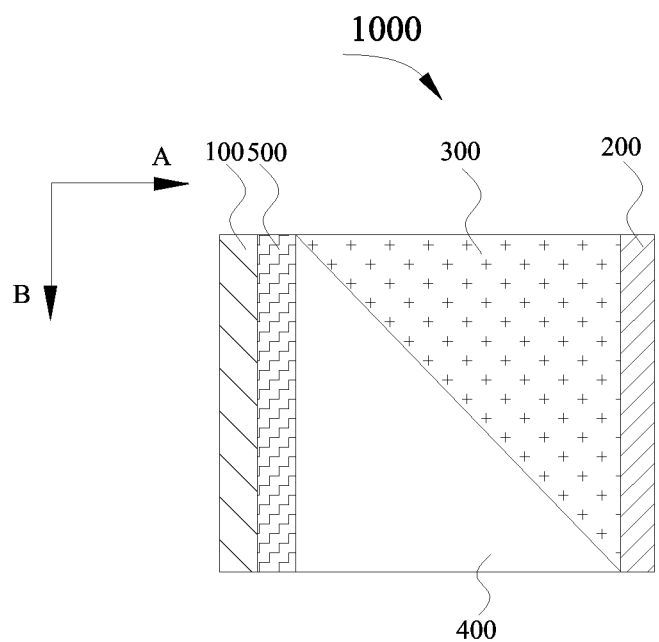
FIG. 4 illustrates a structural schematic view of an optical communication switch according to another embodiment of the disclosure.

It should be noticed that, the expression "the second optical medium layer . . . having its refractive index matching the first refractive index or the second refractive index of the first optical medium layer" as mentioned above should be comprehended in a broad sense, for example, the refractive index (referred to as 'n2' hereinafter) of the second optical medium layer matches the first refractive index (referred to as 'n1$a$' hereinafter), i.e., the refractive index (n2) of the second optical medium layer is the same as or approximate to the first refractive index (n1$a$) of the first optical medium layer in the first state; in other words, in such a condition the light rays may pass through the optical communication switch consisting of the second optical medium layer and the first optical medium layer in the first state, so as to implement the 'optical path state'. Specifically, the refractive index (n2) of the second optical medium layer is for example the same as the first refractive index (n1$a$) or the second refractive index (referred to as 'n1$b$' hereinafter), i.e., a first "refractive index matching" condition in which the refractive index of the second optical medium layer is the same as the first refractive index or the second refractive index of the first optical medium layer; alternatively, there may exist a certain relative deviation between the refractive index (n2) of the second optical medium layer and the first refractive index (n1a) or the second refractive index (n1b), as long as the optical path state may not be influenced, i.e., a second "refractive index matching" condition in which a certain (for example, a predetermined numerical range of) relative deviation exists between the refractive index of the second optical medium layer and the first refractive index or the second refractive index of the first optical medium layer, without influencing the optical path state. According to embodiments of the disclosure, a relative deviation between the refractive index (n2) of the second optical medium layer and the first refractive index (n1a) or the second refractive index (n1b) is for example not more than 25%. Therefore, in such a condition, the refractive index (n2) of the second optical medium layer is relatively approximate to the first refractive index (n1a) or the second refractive index (n1b) of the first optical medium layer, facilitating an implementation of the optical path state. It should be noticed that, a calculation formula for the term "relative deviation" is "|n2−n1a|/n1a" or "|n2−n1b|/n1b", i.e., a ratio between an absolute value of a difference value between the refractive index (n2) of the second optical medium layer and the first refractive index (n1a) or the second refractive index (n1b) of the first optical medium layer, and the first refractive index (n1a) or the second refractive index (n1b); in other words, the ratio is obtained by the absolute value (of a difference value between the refractive index (n2) of the second optical medium layer and the first refractive index (n1a) or the second refractive index (n1b) of the first optical medium layer) divided by the first refractive index (n1a) or the second refractive index (n1b). Specifically, the relative deviation between the refractive index (n2) of the second optical medium layer and the first refractive index (n1a) or the second refractive index (n1b) is for example not more than 10%, not more than 7%, or not more than 5%, or the like. Thereby, a matching/mating degree between the refractive index (n2) of the second optical medium layer and the first refractive index (n1a) or the second refractive index (n1b) may be further enhanced, and utilization of the optical communication switch may in turn be further improved, by setting the relative deviation to be a value falling within a definite range slightly larger than 0. It should be noticed that, the optical path state may be implemented by the optical communication switch, as long as the light rays may be allowed to pass through the second optical medium layer and the first optical medium layer (i.e., there is no total reflection of the light rays occurring at the interface between the second optical medium layer and the first optical medium layer), in principle; in a condition that there is an excessively large difference between the refractive index of the second optical medium layer and the first refractive index or the second refractive index of the first optical medium layer, even if the light rays are allowed to pass therethrough, the light rays may be refracted, i.e., the light rays may deflect at a relatively large angle upon passing through the contact surface between the first optical medium layer and the second optical medium layer, which may be adverse to continuous or successive propagation of the light rays passing therethrough. Therefore, in a condition that the relative deviation between the refractive index (n2) of the second optical medium layer and the first refractive index (n1a) or the second refractive index (n1b) is not more than 25% as above, the refractive index (n2) of the second optical medium layer is relatively approximate to the first refractive index (n1a) or the second refractive index (n1b), thus the optical path state is implemented, and the light rays passing therethrough may continue to propagate relatively completely. According to embodiments of the disclosure, referring to FIG. 1, specific materials of the first substrate 100 and the second substrate 200 may not be specifically restricted to, e.g., glass and the like. According to embodiments of the disclosure, the first substrate 100 and the second substrate 200 are provided opposite to each other. Specifically, specific directions for setting/arranging the first substrate 100 and the second substrate 200 may not be restricted specifically, for example, the first substrate 100 and the second substrate 200 are provided opposite to each other in a vertical direction (i.e., a direction 'B' as illustrated in FIG. 1); and the first substrate 100 and the second substrate 200 are for example alternatively provided opposite to each other in a horizontal direction (referring to FIG. 4, the first substrate 100 and the second substrate 200 are provided opposite to each other in a horizontal direction (i.e., a direction 'A' as illustrated)). According to embodiments of the disclosure, the first substrate 100 and the second substrate 200 may also for example be provided parallel to each other; however, they may be simultaneously provided in a manner that they are staggered slightly with respect to each other, rather than being provided strictly opposite to each other.

According to embodiments of the disclosure, the first optical medium layer 300 is formed by the phase-change material whose specific type may not be specifically restricted, as long as the material may implement a reversible phase transformation between the first state and the second state (e.g., the amorphous state and the crystalline state) under a certain condition (e.g., the heating state); and the material may exist steadily in both the first state and the second state. Specifically, the phase-change material comprises $Ge_2Sb_2Te_5$, with the amorphous state thereof for example being defined as the first state, and the crystalline state thereof for example being defined as the second state. The material $Ge_2Sb_2Te_5$ has its first refractive index of about 2.7 in its amorphous state and its second refractive index of about 1.6 in its crystalline state. According to embodiments of the disclosure, a specific material for forming the second optical medium layer may not be restricted specifically, as along as its refractive index may match the first refractive index or the second refractive index of the first optical medium layer. By way of example, the material for forming the second optical medium layer for example comprises titanium dioxide having a refractive index of about 2.5~2.7; i.e., the refractive index of the titanium dioxide of the second optical medium layer matches the refractive index of $Ge_2Sb_2Te_5$ of the first optical medium layer in its crystalline state. As such, in a condition that the first optical medium layer is in the amorphous state, the optical path state is facilitated; and once the first optical medium layer is heated by the heating device, the first optical medium layer is transformed into the crystalline state, thus the optical drop state is readily implemented. Therefore, both the optical path state and the optical drop state are readily implemented, with a relatively higher sensitivity, and a relatively shorter response time (i.e., a relatively faster response).

According to embodiments of the disclosure, both specific type and setting location of the heating device 500 may not be restricted specifically, as long as the first optical medium layer 300 may be heated to control its switching between the first state and the second state. According to embodiments of the disclosure, the heating device 500 may for example be a heating electrode; as such, by controlling a voltage applied onto the heating electrode, the heating may be simply performed onto the first optical medium layer 300; in other words, by controlling the voltage, it is allowed to control the driving of the optical communication switch 1000 simply, and in turn to facilitate a switching between the optical path state and the optical drop state, with a relatively simpler operation and a relatively higher sensitivity. According to embodiments of the disclosure, referring to FIG. 1, the first optical medium layer 300 is for example provided to abut closely against the first substrate 100, and the heating device 500 is for example provided at a side of the first optical medium layer 300 facing towards the first substrate 100, facilitating the heating device 500 being located to abut directly against the first optical medium 300 and in turn heating the first optical medium layer 300 directly. Specifically, the heating device 500 may for example merely cover a portion of the surface at a side of the first optical medium layer 300 facing towards the first substrate 100; alternatively, the heating device 500 may also for example completely cover all the surface at the side of the first optical medium layer 300 facing towards the first substrate 100. As such, when all the surface at the side of the first optical medium layer 300 facing towards the first substrate 100 is covered, it facilitates heating the first optical medium layer 300 more sufficiently and more quickly, and in turn facilitates the phase transformation of the first optical medium layer 300, thus enhancing the sensitivity of the optical communication switch.

According to embodiments of the disclosure, both the first optical medium layer 300 and the second optical medium layer 400 are provided between the first substrate 100 and the second substrate 200, and the first optical medium layer 300 and the second optical medium layer are in contact with each other. According to embodiments of the disclosure, specific shapes of the first optical medium layer 300 and the second optical medium layer 400 are not restricted specifically, as long as the optical communication switch possesses both the first optical medium layer 300 and the second optical medium layer 400 in the incidence direction of the light rays. Therefore, once the light rays are incident on the optical communication switch, and in a condition that respective refractive indices of the first optical medium layer 300 and the second optical medium layer 400 are approximate to each other, it may facilitate an implementation of the optical path state; and in a condition that respective refractive indices of the first optical medium layer 300 and the second optical medium layer 400 fail to match each other, a total reflection of the light rays may occur at the contact surface between the first optical medium layer 300 and the second optical medium layer 400, i.e., implementing the optical drop state.

Figure 5:
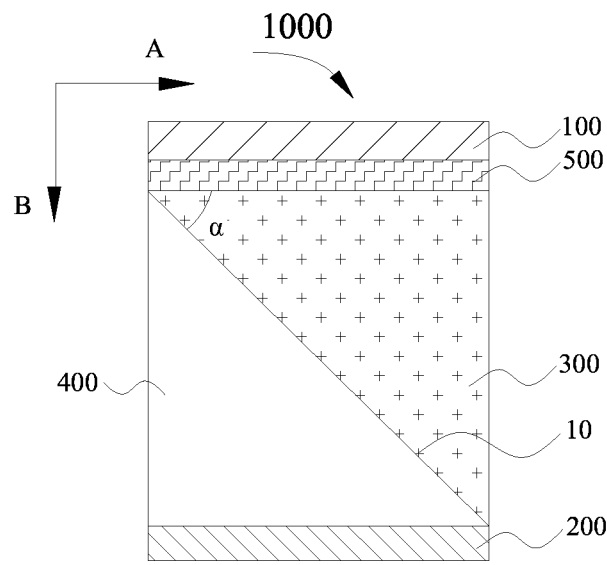
FIG. 5 illustrates a structural schematic view of an optical communication switch according to still another embodiment of the disclosure.

According to embodiments of the disclosure, e.g., as illustrated in FIG. 1, the first optical medium layer 300 and the second optical medium layer 400 are for example two prismatoids interposed between the first substrate 100 and the second substrate 200 and in positive fit with each other (i.e., each is defined as a polyhedron whose all vertexes fall within a range defined between two planes in parallel with each other), each prismatoid having two bottom surfaces each in a form of quadrilateral shape and having four side surfaces each in a form of quadrilateral shape. By way of example, two opposite side surfaces (e.g., they are arranged to be opposite to each other in a direction extending from left to right as illustrated) may for example be rectangles; and the other two opposite side surfaces (e.g., they are arranged parallel to a plane of the paper sheet of the drawing) may for example be trapezoids, e.g., respective trapezoidal side surfaces of the first optical medium layer 300 and the second optical medium layer 400 abutting against each other are illustrated in FIG. 1, and more specifically, the other two opposite side surfaces which are trapezoidal side surfaces in each of the first optical medium layer 300 and the second optical medium layer 400 are for example each in a form of right trapezoid. According to embodiments of the disclosure, e.g., alternatively, as illustrated in FIG. 5, the first optical medium layer 300 and the second optical medium layer 400 may also for example be two wedges in positive fit with each other, each wedge having a bottom surface in a form of square shape, two triangle sidewalls opposite to each other, and a first quadrilateral sidewall and a second quadrilateral sidewall. More specifically, the two triangle sidewalls opposite to each other are for example each in a form of right triangle, e.g., respective triangle sidewalls of the first optical medium layer 300 and the second optical medium layer 400 are arranged parallel to the plane of the paper sheet of the drawing, as illustrated in FIG. 5, and the first quadrilateral sidewall and the second quadrilateral sidewall are for example arranged to be opposite to each other in the direction extending from left to right as illustrated in FIG. 5.

Specifically, referring to FIG. 5, in a condition that the first optical medium layer 300 and the second optical medium layer 400 are two wedges in positive fit with each other, and respective two triangle sidewalls opposite to each other of each wedge are for example each in a form of right triangle, then an orthogonal projection of a right-angle side/edge of one of the two triangle sidewalls on the first substrate 100 may for example extend across the entire first substrate 100, and the heating device 500 (e.g., the heating electrode) may for example be provided on all the surface at a side of the first substrate 100 facing towards the first optical medium layer 300; as such, the heating device 500 is capable of heating the first optical medium layer 300 sufficiently, enhancing the sensitivity of the phase transformation of the first optical medium layer 300, and in turn improving the sensitivity and utilization of the optical communication switch 1000.

Figure 6:
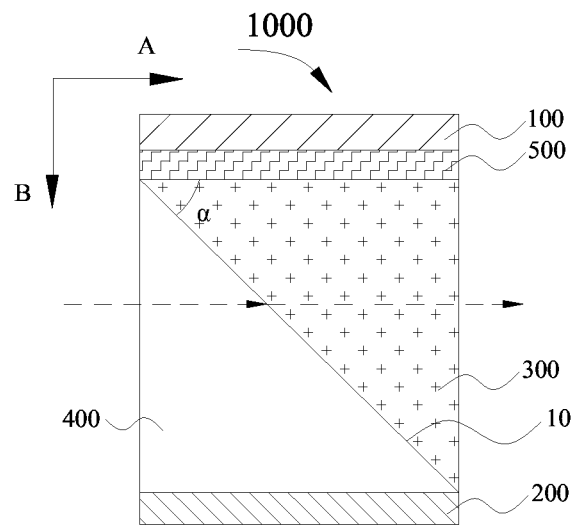
FIG. 6 illustrates a structural schematic view of an optical communication switch implementing an optical path state, according to yet another embodiment of the disclosure.

According to embodiments of the disclosure, referring to FIG. 1 and FIG. 5, the contact surface which is an inclined surface exists between the first optical medium layer 300 and the second optical medium layer 400; especially as illustrated in FIG. 5, the contact surface 10 which is an inclined surface exists between the first optical medium layer 300 and the second optical medium layer 400. Specifically, as illustrated in FIG. 1, in a condition that the first optical medium layer 300 and the second optical medium layer 400 are shaped to be two prismatoids in positive fit with each other, then the contact surface may for example be the quadrilateral side surface (i.e., quadrilateral sidewall) of a respective one of the two prismatoids. In addition, as illustrated in FIG. 5, specifically, in a condition that the first optical medium layer 300 and the second optical medium layer 400 are shaped to be two wedges in positive fit with each other, then the contact surface may for example be the inclined surface of a respective one of the two wedges. It should be noticed that, the expression "inclined surface of a respective one of the two wedges" may for example be a sidewall of a respective one of the two wedges, e.g., as mentioned above, the expression "inclined surface of a respective one of the two wedges" may specifically for example be the first quadrilateral sidewall or the second quadrilateral sidewall of a respective one of the two wedges. And specifically, an angle which is labeled by 'α' as illustrated is formed between the contact surface 10 and the first substrate 100, $0 < \alpha \leq 90°$; i.e., the angle α is larger than 0° and less than or equal to 90°. And it should be noticed that, the expression "an angle . . . formed between the contact surface 10 and the first substrate 100" refers to an angle which has a relatively small value in an angular range formed between the contact surface 10 and the first substrate 100. Thereby, specific shapes of the first optical medium layer 300 and the second optical medium layer 400 may for example be set as required, as long as the optical communication switch comprises both the first optical medium layer 300 and the second optical medium layer 400 in the incidence direction of the light rays and the light rays exhibits a passing-through state or a total-reflection state at the contact surface 10 and enables a switching therebetween, i.e., the light rays may either be in the optical path state or in the optical drop state at the contact surface 10, and may switch between these two states. Specifically, once the angle α between the contact surface 10 and the first substrate 100 is determined, for example, the incidence angle of the light rays may be adjusted by changing the incidence direction of the light rays, such that a total reflection of the light rays may occur at the contact surface 10 so as to implement the optical drop functionality. Specifically, referring to FIG. 6, in a condition that the first optical medium layer 300 and the second optical medium layer 400 are wedges in positive fit with each other, then the first quadrilateral sidewall 410 which function as the second optical medium layer 400 of one wedge may for example be located on an external side of the optical communication switch (seen the left side as illustrated); accordingly, the contact surface 10 may for example be the second quadrilateral sidewall of the wedge, and the light rays may be incident on the optical communication switch 1000 in a direction perpendicular to the first quadrilateral sidewall 410 (referring to the direction 'A' as illustrated), then the light rays may propagate in the incidence direction, i.e., in a direction of an expected optical path which is parallel to the direction 'A' as illustrated in broken line and is expected to extend through both the second optical medium layer 400 and the first optical medium layer 300 in the optical communication switch 1000, thus facilitating a determination on whether the optical path state or the optical drop state of the light rays may be implemented depending on whether the refractive index of the second optical medium layer 400 matches the refractive index of the first optical medium layer 300. By way of example, as illustrated in FIG. 6, in a condition that the refractive index of the second optical medium layer 400 matches the refractive index (i.e., the first refractive index or the second refractive index) of the first optical medium layer 300, once the light rays are incident in a direction perpendicular to the first quadrilateral sidewall 410 of the second optical medium layer 400 (i.e., a normal direction of the first quadrilateral sidewall functions as aforementioned incidence direction), the light rays may in turn exit the first optical medium layer 300 of the optical communication switch in a direction perpendicular to the quadrilateral sidewall of the first optical medium layer 300 which is located at an external side of the optical communication switch (seen the right side as illustrated), so as to implement the optical path state.

According to embodiments of the disclosure, the relative deviation between the refractive index (n2) of the second optical medium layer and a larger one (e.g., n1a) of the first refractive index (n1a) and the second refractive index (n1b) is not more than 25%; in other words, the refractive index (n2) of the second optical medium layer for example matches the larger one of the first refractive index (n1a) and the second refractive index (n1b). As such, once the light rays enter the optical communication switch from the second optical medium layer, in a condition that the first optical medium layer has the first refractive index (n1a) which is the larger one of the first refractive index (n1a) and the second refractive index (n1b), the optical path state may be implemented; while in a condition that the first optical medium layer is transformed to have the second refractive index (n1b), for example, since the refractive index (n2) of the second optical medium layer is approximate to the first refractive index (n1a) but the refractive index (n2) of the second optical medium layer is larger than the second refractive index (n1b), i.e., the light rays enter an optically thinner medium from an optically denser medium. Therefore, at the contact surface between the second optical medium layer and the first optical medium layer, a total reflection of the light rays may thus occur, so as to implement the switching from the optical path state to the optical drop state. Specifically, referring to FIG. 7, upon implementing the optical drop state, the incidence angle in a condition that the total reflection of the light rays occurs should be larger than or equal to a critical angle 'C' of incidence for total reflection of the light rays. On a basis of a formula for calculation of the total reflection, i.e., Sin C=n2/n1b, the critical angle 'C' of incidence for total reflection of the light rays may be calculated, such that the total reflection of the light rays may occur and the optical drop state may in turn be implemented as long as the incidence angle of the light rays is larger than or equal to the critical angle of incidence.

According to embodiments of the disclosure, the relative deviation between the refractive index (n2) of the second optical medium layer 400 and a smaller one (e.g., n1b) of the first refractive index (n1a) and the second refractive index (n1b) is for example not more than 25%. In such a condition, as long as the incidence direction of the light rays is changed, e.g., the light rays enter the optical communication switch from the first optical medium layer 300, then, in a condition that the first optical medium layer has the second refractive index (n1b), the optical path state is implemented; and in a condition that the first optical medium layer has the first refractive index (n1a), e.g., since the refractive index (n2) of the second optical medium layer is approximate to the second refractive index (n1b), and the first refractive index (n1a) is larger than the second refractive index (n1b) for the first optical medium layer, then the light rays may for example enter the optically thinner medium from the optically denser medium. Therefore, at the contact surface between the second optical medium layer and the first optical medium layer, a total reflection of the light rays may occur so as to implement the optical drop state.

Figure 7:
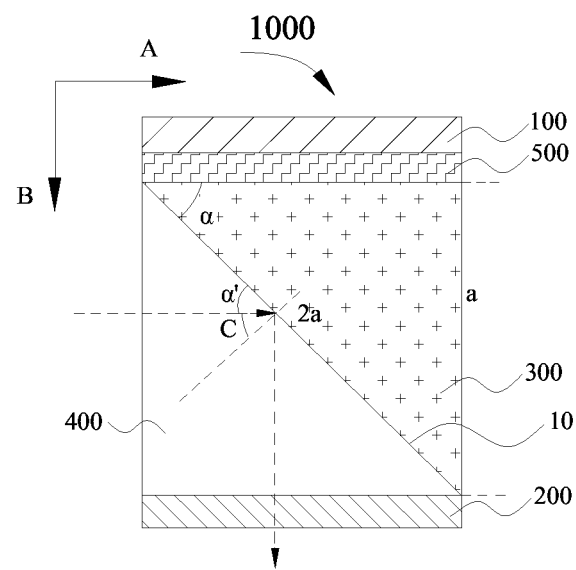
FIG. 7 illustrates a structural schematic view of an optical communication switch implementing an optical drop state, according to still yet another embodiment of the disclosure.

According to embodiments of the disclosure, in the optical communication network, the incidence direction of the light rays is typically fixed (e.g., the direction 'A' as illustrated in FIG. 7). Therefore, in order to implement the total reflection of the light rays at the contact surface 10, for example, a tiling level/degree of the contact surface 10 may be adjusted; specifically, e.g., tiling levels as set for respective second quadrilateral sidewalls of the two wedges functioning as the first optical medium layer and the second optical medium layer respectively may be adjusted during preparation, or the whole optical communication switch may be slightly rotated relative to the optical incidence direction 'A' during use; in other words, a magnitude of the angle α between the contact surface 10 and the first substrate 100 may be adjusted, such that a total reflection of incident light rays (e.g., light rays which are incident in the direction 'A' as illustrated in FIG. 7) may hereby occur at the contact surface 10.

According to embodiments of the disclosure, referring to FIG. 7, the first substrate 100 and the second substrate 200 are provided parallel to each other, and for example are both parallel to the direction 'A'. The first optical medium layer 300 and the second optical medium layer 400 are two wedges which are in positive fit with and congruent with each other, each wedge (e.g., one wedge which functions as the second optical medium layer 400 located at the left side, as illustrated) having a bottom surface in a form of square shape, two regular-triangle sidewalls opposite to each other (FIG. 7 illustrates one of the two regular-triangle sidewalls, which appears on the paper sheet of the drawing), and a first quadrilateral sidewall 410 for example located at the left side and a second quadrilateral sidewall opposite to the first quadrilateral sidewall. The bottom surface in the form of square shape is parallel to the first substrate 100, the two regular-triangle sidewalls are for example arranged to be opposite to each other in a direction extending from left to right as illustrated and are perpendicular to the bottom surface (i.e., perpendicular to the first substrate 100), the first quadrilateral sidewall 410 is in a form of square shape and perpendicular to the bottom surface and is located on an external side (see the left side as illustrated) of the optical communication switch 1000, and the second quadrilateral sidewall of the second optical medium layer 400 functions as the contact surface 10 of the second optical medium layer 400 in contact with the first optical medium layer 300, and a quadrilateral sidewall (which is shaped the same as the second quadrilateral sidewall) of the first optical medium layer 300 functions as the contact surface of the first optical medium layer 300 in contact with the second optical medium layer 400, the contact surface 10 being an inclined surface. Once the light rays are incident in a direction perpendicular to the first quadrilateral sidewall 410 (referring to the direction 'A' as illustrated in FIG. 7), the angle α between the contact surface 10 and the first substrate 100 is for example complementary to the critical angle 'C' of incidence for total reflection of the light rays at the contact surface 10 (i.e., a sum of the critical angle 'C' of incidence and an angle α' between the incident light rays and the inclined surface is 90°; and in a condition that the first substrate 100 and the second substrate 200 are parallel to the direction 'A', then the angle α' is equal to the angle α). As such, upon preparing the optical communication switch, above all, an appropriate phase-change material is selected to be formed into the first optical medium layer, and a material which has a refractive index matching the first refractive index or the second refractive index of the phase-change material is selected to be formed into the second optical medium layer; and then the critical angle 'C' of incidence for total reflection of the light rays may for example be determined depending on the refractive indices of materials for the first optical medium layer 300 and the second optical medium layer 400 respectively; and next, a total reflection of the light rays may occur at the interface between the first optical medium layer and the second optical medium layer so as to implement the optical drop functionality, as long as the incidence angle of the light rays is larger than or equal to the critical angle 'C' of incidence. And the incidence angle of the light rays may for example be changed by regulating the incidence direction of the light rays and adjusting the orientation of the contact surface. Thereby, on one hand, referring to FIG. 7, in the optical communication network, since light rays may typically be incident in a horizontal direction (i.e., a direction perpendicular to the first quadrilateral sidewall 410, i.e., the direction 'A' as illustrated), the incidence direction of the light rays is fixed in such a condition, such that the orientation of the contact surface 10 is for example adjusted so as to ensure that the incidence angle meets the condition of total reflection there; specifically, an angle or an angular range between the contact surface 10 and the first substrate 100 may be determined depending on the critical angle 'C' of incidence as determined by above steps, such that a total reflection of the light rays may occur at the contact surface 10 and in turn the optical drop functionality is realized once the light rays are incident into the prepared optical communication switch in the horizontal direction (i.e., in the direction perpendicular to the first quadrilateral sidewall 410, i.e., the direction 'A' as illustrated), further improving the usability of the optical communication switch. On the other hand, the orientation of the contact surface 10 may for example be set arbitrarily, i.e., at random, and once the optical communication switch is prepared, then the orientation of the contact surface 10 is determined and fixed, and next the incidence direction of the light rays should be adjusted such that the incidence angle meets the condition of total reflection there; specifically, by way of example, an installation orientation of the optical communication switch in the optical communication network may be adjusted, e.g., by rotating the optical communication switch appropriately in relative to the incidence direction of the light rays such that the incidence angle is larger than or equal to the critical angle of incidence so as to incur a total reflection of the light rays at the contact surface 10 and in turn to implement the optical drop functionality.

Similarly, as illustrated in FIG. 1, e.g., the first optical medium layer 300 and the second optical medium layer 400 are two prismatoids in positive fit with each other, and an inclined surface of each prismatoid functions as the contact surface. The first substrate 100 and the second substrate 200 are provided parallel to each other, and the first optical medium layer and the second optical medium layer are two prismatoids which are congruent with each other, each prismatoid having two bottom surfaces opposite to each other and each in a form of quadrilateral shape parallel to the first substrate, and four sidewalls each in a form of quadrilateral shape, one of two opposite sidewalls being located on an external side of the optical communication switch and the other one of the two opposite sidewalls functioning as the contact surface. And the light rays are incident onto and enter the optical communication switch in a direction perpendicular to the one of two opposite quadrilateral sidewalls located on the external side, with an angle between the other one sidewall functioning as the contact surface and the first substrate being complementary to the critical angle of incidence for total reflection of the light rays at the contact surface. As such, a switching functionality between the optical path state and the optical drop state may be realized, similar to that of the optical communication switch as illustrated in FIG. 7.

According to embodiments of the disclosure, referring to FIG. 7, in a condition that the first optical medium layer 300 is formed by $Ge_2Sb_2Te_5$, the second optical medium layer 400 is formed by titanium dioxide, then, for example, the critical angle 'C' of incidence may be calculated to be about 60°, depending on respective refractive indices of these two materials and the calculation formula for calculating the critical angle 'C' of incidence for the total reflection, i.e., Sin C=n2/n1$b$ as mentioned above; hereby, the angle α between the contact surface 10 and the first substrate 100 is about 30°. As such, once the optical communication switch is installed into the optical communication network, then the light rays are incident in the horizontal direction (i.e., the direction perpendicular to the first quadrilateral sidewall, i.e., the direction 'A' as illustrated in FIG. 7), with an incidence angle of 60°, such that a total reflection of the light rays hereby occurs at the contact surface 10 so as to implement the optical drop functionality. Furthermore, once the dimensions of the first substrate 100 have been determined, both an angle of the right triangle being 30° and a length of one right-angle side/edge of the right triangle (i.e., the length of the first substrate in the direction 'A') are known already, then both a length of another right-angle side/edge and a length of the inclined side/edge of the right triangle can be determined thereby; in other words, dimensions of the first optical medium layer 300 and the second optical medium layer 400 to be prepared can also be determined. By way of example, referring to FIG. 7, in a condition that a length of the right-angle side/edge of the right triangle opposite to the angle α is defined as 'a' as illustrated, by taking an exemplary angular relationship as mentioned in above embodiments into account, then the length of the contact surface 10 may for example be 2a.

In other embodiments of the disclosure, by way of example, as illustrated in FIG. 1, similarly, the first substrate 100 and the second substrate 200 are provided parallel to each other, and the first optical medium layer 300 and the second optical medium layer 400 are two prismatoids congruent with and in positive fit with each other, each prismatoid having two bottom surfaces opposite to each other and each in a form of square shape parallel to the first substrate, two trapezoidal sidewalls opposite to each other and perpendicular to the two bottom surfaces, and a first quadrilateral sidewall and a second quadrilateral sidewall opposite to each other, the first quadrilateral sidewall being a square which is perpendicular to the bottom surface and located on an external side of the optical communication switch, and the second quadrilateral sidewall functioning as the contact surface which is an inclined surface existing between the first optical medium layer and the second optical medium layer, with an angle α of 30° formed between the contact surface and the first substrate. As such, a switching functionality between the optical path state and the optical drop state may be realized, similar to that of the optical communication switch as illustrated in FIG. 7.

In conclusion, as compared with relevant art, embodiments of the disclosure have beneficial effects as below:

As far as the optical communication switch according to the embodiments of the disclosure is concerned, it can be formed collectively by the first optical medium layer formed by the phase-change material and the second optical medium layer having a fixed refractive index, and the refractive index of the first optical medium layer may for example be changed by a phase transformation of the phase-change material with the action of the heating device, and then a switching functionality between the optical path state and the optical drop state is enabled depending on whether respective refractive indices of the second optical medium layer and the first optical medium layer match each other or not. The optical communication switch is simple in terms of its preparing processes, and the optical path state and the optical drop state may be controlled by an driving of the heating device, with a relatively higher sensitivity, and a relatively shorter response time (i.e., a relatively faster response) e.g., with a nanosecond (ns) precision, and thus a superior utilization.

In another aspect of embodiments of the disclosure, an optical controlling method with the optical communication switch as above is provided. According to embodiments of the disclosure, the method comprises: driving the phase-change material which forms the first optical medium layer to switch between a first state in which one of an optical path state and an optical drop state is implemented by the light rays passing therethrough and a second state in which the other one of the optical path state and the optical drop state is implemented by the light rays passing therethrough, by the heating device, so as to change an emergent direction of the light rays passing therethrough. As such, the optical communication switch may be driven simply by the heating device, with a relatively simpler operation and a relatively higher sensitivity and a relatively shorter response time (i.e., a relatively faster response). According to embodiments of the disclosure, the heating device may for example be a heating electrode. Thereby, by controlling the voltage of the heating electrode, the first optical medium layer may be simply heated thereby so as to further implement a simple and convenient control on driving of the optical communication switch, with a relatively simpler operation and a relatively higher sensitivity.

According to embodiments of the disclosure, the first optical medium layer is formed by $Ge_2Sb_2Te_5$, the second optical medium layer is formed by titanium dioxide, and the heating electrode is formed by indium tin oxide. In a condition that the heating electrode may not heat, the first optical medium layer is in the amorphous state, with a refractive index thereof matching the refractive index of the second optical medium layer, and once the light rays are incident thereon, they may for example pass through the first optical medium layer and the second optical medium layer so as to realize the optical path state. After that, the phase-change material which forms the first optical medium layer is switched from the amorphous state to the crystalline state by applying a pulsed current having an magnitude of 0.2~0.8 mA on the first optical medium layer by the heating electrode for 6~100 ns, the refractive index of the first optical medium layer becomes decreased to be less than the refractive index of the second optical medium layer, therefore, once the light rays are incident on the second optical medium layer, a total reflection of the light rays may occur at the contact surface between the second optical medium layer and the first optical medium layer so as to realize the optical drop state. As such, a simple and convenient control on driving of the optical communication switch is implemented by the heating electrode, with a relatively simpler operation and a relatively higher sensitivity, and a shorter response time (i.e., a relatively faster response).

Figure 8:
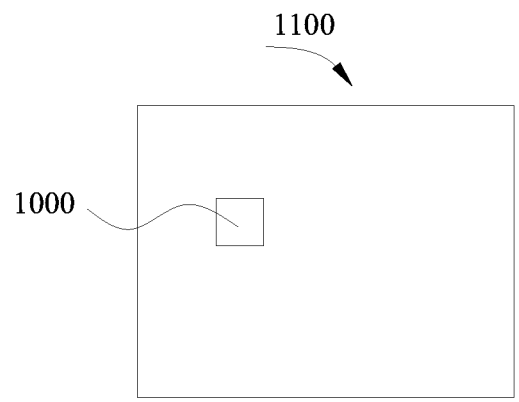
FIG. 8 illustrates a structural schematic view of an array substrate according to an embodiment of the disclosure.

In still another aspect of embodiments of the disclosure, an array substrate is further provided. According to embodiments of the disclosure, referring to FIG. 8, the array substrate 1100 comprises the optical communication switch 1000 as above. Thereby, the array substrate possesses all features and advantages of the optical communication switch 1000 as above, without being repeated herein once again.

In yet another aspect of embodiments of the disclosure, a display device is also provided. According to embodiments of the disclosure, the display device comprises the arrays substrate as above. Thereby, the display device possesses all features and advantages of the array substrate as above, without being repeated herein once again.

In depiction of the embodiments of the disclosure, it should be comprehended that, any orientative or positional relationship indicated by terminologies "upper", "lower", "horizontal", and so on is based on orientative or positional relationship as illustrated in accompanied drawings, only intending to facilitate depictions of embodiments of the disclosure, rather than requiring/restricting the embodiments of the disclosure to be constructed and operated at a certain orientation, therefore, such terminologies should not be comprehended as limitations to embodiments of the disclosure.

In depictions herein, description referring to terminologies such as "an embodiment", "embodiments", "example", "specific example" or "examples" may mean that specific feature(s), structure(s), material or characteristics in combination therewith may be contained within at least one embodiment or example of the disclosure. In the description, illustrative expressions concerning above terminologies may not necessarily refer to same embodiment(s)/example(s). Furthermore, specific feature(s), structure(s), material or characteristics as depicted may be combined mutually in any one or more of embodiments or examples appropriately. In addition, it may occur to those skilled to join and combine different embodiments or examples as depicted herein. In addition, terminologies "first", "second" may only intend to be used for depiction, rather than intending to be comprehended to indicate or imply relative importance or to indicate impliedly specific number of technical features as mentioned.

Although the embodiments disclosed in the present disclosure are as described and illustrated above, they are merely provided exemplarily, and are not intended to limit the present disclosure. Any modifications and variations may be made by those skilled in the art in terms of form and detail without departing from the spirit and scope of the present disclosure, but the scope of the present disclosure is defined by the appended claims.

What is claimed is:

1. An optical communication switch, comprising:
a first substrate and a second substrate opposite to each other;
a first optical medium layer disposed between the first substrate and the second substrate and formed by a phase-change material, the phase-change material having a first refractive index in a first state thereof in which light rays passing therethrough implement one of an optical path state and an optical drop state, and a second refractive index in a second state thereof in which light rays passing therethrough implement the other one of the optical path state and the optical drop state;
a second optical medium layer disposed between the first substrate and the second substrate and in contact with the first optical medium layer by abutting against the first optical medium layer closely, the second optical medium layer having a refractive index matching the first refractive index or the second refractive index of the first optical medium layer, comprising: a first "refractive index matching" condition in which the refractive index of the second optical medium layer is the same as the first refractive index or the second refractive index of the first optical medium layer; and a second "refractive index matching" condition in which a certain relative deviation exists between the refractive index of the second optical medium layer and the first refractive index or the second refractive index of the first optical medium layer, without influencing the optical path state; and
a heating device configured to enable the phase-change material to switch between the first state and the second state.

2. The optical communication switch according to claim 1, wherein a relative deviation between the refractive index of the second optical medium layer and the first refractive index or the second refractive index is not more than 25%, which belongs to the second "refractive index matching" condition, without influencing the optical path state.

3. The optical communication switch according to claim 2, wherein the relative deviation between the refractive index of the second optical medium layer and a larger one of the first refractive index and the second refractive index is not more than 25%.

4. The optical communication switch according to claim 1, wherein a contact surface which is an inclined surface exists between the first optical medium layer and the second optical medium layer, with an angle $\alpha$ larger than 0° and less than or equal to 90° being formed between the contact surface and the first substrate.

5. The optical communication switch according to claim 4, wherein the first optical medium layer and the second optical medium layer are two wedges in positive fit with each other, and an inclined surface of each wedge functions as the contact surface.

6. The optical communication switch according to claim 5, wherein the first substrate and the second substrate are provided parallel to each other, and the first optical medium layer and the second optical medium layer are two wedges which are congruent with each other, each wedge having a bottom surface in a form of square shape parallel to the first substrate, and a square sidewall which is located on an external side of the optical communication switch and perpendicular to the bottom surface; and
wherein light rays are incident onto and enter the optical communication switch in a direction perpendicular to the square sidewall, with an angle between the contact surface and the first substrate being complementary to a critical angle of incidence for total reflection of the light rays at the contact surface.

7. The optical communication switch according to claim 4, wherein the first optical medium layer and the second optical medium layer are two prismatoids in positive fit with each other, and an inclined surface of each prismatoid functions as the contact surface.

8. The optical communication switch according to claim 7, wherein the first substrate and the second substrate are provided parallel to each other, and the first optical medium layer and the second optical medium layer are two prismatoids which are congruent with each other, each prismatoid having two bottom surfaces opposite to each other and each in a form of quadrilateral shape parallel to the first substrate, and four sidewalls each in a form of quadrilateral shape, one of two opposite sidewalls being located on an external side of the optical communication switch and the other one of the two opposite sidewalls functioning as the contact surface; and
wherein light rays are incident onto and enter the optical communication switch in a direction perpendicular to the one of two opposite sidewalls located on the external side, with an angle between the other one sidewall functioning as the contact surface and the first substrate being complementary to a critical angle of incidence for total reflection of the light rays at the contact surface.

9. The optical communication switch according to claim 1, wherein the phase-change material comprises $Ge_2Sb_2Te_5$, with the first state thereof being amorphous state and the second state thereof being crystalline state; and
wherein a material for forming the second optical medium layer comprises titanium dioxide.

10. The optical communication switch according to claim 9, wherein the first substrate and the second substrate are provided parallel to each other, and the first optical medium layer and the second optical medium layer are two wedges congruent with and in positive fit with each other, each wedge having a bottom surface in a form of square shape parallel to the first substrate, two regular-triangle sidewalls opposite to each other and perpendicular to the bottom surface, and a first quadrilateral sidewall and a second quadrilateral sidewall opposite to each other, the first quadrilateral sidewall being in a form of square shape perpendicular to the bottom surface and located on an external side of the optical communication switch, and the second quadrilateral sidewall functioning as the contact surface which is an inclined surface between the first optical medium layer and the second optical medium layer, with an angle α of 30° formed between the contact surface and the first substrate.

11. The optical communication switch according to claim 9, wherein the first substrate and the second substrate are provided parallel to each other, and the first optical medium layer and the second optical medium layer are two prismatoids congruent with and in positive fit with each other, each prismatoid having two bottom surfaces opposite to each other and each in a form of square shape parallel to the first substrate, two trapezoidal sidewalls opposite to each other and perpendicular to the two bottom surfaces, and a first quadrilateral sidewall and a second quadrilateral sidewall opposite to each other, the first quadrilateral sidewall being a square which is perpendicular to the bottom surface and located on an external side of the optical communication switch, and the second quadrilateral sidewall functioning as the contact surface which is an inclined surface existing between the first optical medium layer and the second optical medium layer, with an angle α of 30° formed between the contact surface and the first substrate.

12. The optical communication switch according to claim 1, wherein the heating device is a heating electrode, the first optical medium layer is provided to abut against the first substrate, and the heating electrode is provided on a side of the first optical medium layer facing towards the first substrate.

13. The optical communication switch according to claim 1, wherein a material for forming the heating device comprises indium tin oxide.

14. An array substrate, comprising the optical communication switch according to claim 1.

15. A display device, comprising the array substrate according to claim 14.

16. An optical controlling method with an optical communication switch,
the optical communication switch comprising:
a first substrate and a second substrate opposite to each other;
a first optical medium layer disposed between the first substrate and the second substrate and formed by a phase-change material, the phase-change material having a first refractive index in a first state thereof in which light rays passing therethrough implement one of an optical path state and an optical drop state, and a second refractive index in a second state thereof in which light rays passing therethrough implement the other one of the optical path state and the optical drop state;
a second optical medium layer disposed between the first substrate and the second substrate and in contact with the first optical medium layer by abutting against the first optical medium layer closely, the second optical medium layer having a refractive index matching the first refractive index or the second refractive index of the first optical medium layer, comprising: a first "refractive index matching" condition in which the refractive index of the second optical medium layer is the same as the first refractive index or the second refractive index of the first optical medium layer; and a second "refractive index matching" condition in which a certain relative deviation exists between the refractive index of the second optical medium layer and the first refractive index or the second refractive index of the first optical medium layer, without influencing the optical path state; and
a heating device configured to enable the phase-change material to switch between the first state and the second state,
the method comprising:
driving the phase-change material which forms the first optical medium layer to switch between the first state and the second state, by the heating device, so as to change an emergent direction of the light rays passing therethrough.

17. The method according to claim 16, wherein the heating device is a heating electrode; and the step 'driving the phase-change material which forms the first optical medium layer to switch between the first state and the second state, by the heating device' further comprises:
changing a condition of the first optical medium layer by controlling a voltage applied onto the heating electrode.

18. The method according to claim 17, wherein the first optical medium layer is formed by $Ge_2Sb_2Te_5$, the second optical medium layer is formed by titanium dioxide, and the heating electrode is formed by indium tin oxide; and
the phase-change material which forms the first optical medium layer is switched from an amorphous state to a crystalline state by applying a pulsed current having a magnitude of 0.2~0.8 mA on the first optical medium layer by the heating electrode for 6~100 ns.

* * * * *